United States Patent
Kim

(10) Patent No.: US 11,495,815 B2
(45) Date of Patent: Nov. 8, 2022

(54) ELECTROLYTE MEMBRANE OF A MEMBRANE-ELECTRODE ASSEMBLY HAVING IMPROVED CHEMICAL DURABILITY AND A MANUFACTURING METHOD THEREOF

(71) Applicants: HYUNDAI MOTOR COMPANY, Seoul (KR); KIA CORPORATION, Seoul (KR)

(72) Inventor: Yong Min Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 19 days.

(21) Appl. No.: 17/371,481

(22) Filed: Jul. 9, 2021

(65) Prior Publication Data

US 2021/0336285 A1 Oct. 28, 2021

Related U.S. Application Data

(62) Division of application No. 16/385,985, filed on Apr. 16, 2019, now Pat. No. 11,088,379.

(30) Foreign Application Priority Data

Dec. 20, 2018 (KR) .......... 10-2018-0166105

(51) Int. Cl.
- *H01M 8/1032* (2016.01)
- *H01M 8/1004* (2016.01)

(Continued)

(52) U.S. Cl.
CPC ....... *H01M 8/1032* (2013.01); *H01M 8/1004* (2013.01); *H01M 8/109* (2013.01);
(Continued)

(58) Field of Classification Search
CPC ............. H01M 8/1032; H01M 8/1004; H01M 8/1027; H01M 8/109; H01M 8/1023;
(Continued)

(56) References Cited

U.S. PATENT DOCUMENTS 8,906,573 B2 12/2014 Ishikawa
9,923,213 B2 3/2018 Kim
(Continued)

FOREIGN PATENT DOCUMENTS

KR 101672588 B1 11/2016
KR 101767267 B1 8/2017

*Primary Examiner* — Ula C Ruddock
*Assistant Examiner* — Matthew W Van Oudenaren
(74) *Attorney, Agent, or Firm* — Lempia Summerfield Katz LLC

(57) ABSTRACT

An electrolyte membrane of a membrane-electrode assembly is formed by a manufacturing method yielding a membrane with improved chemical durability. The manufacturing method includes preparing an antioxidant solution, mixing the antioxidant solution and a first ionomer dispersion solution, drying the mixture to produce a composite having an antioxidant and a first ionomer surrounding the antioxidant, introducing and mixing the composite with a second ionomer dispersion solution, and applying that mixture to a substrate and drying the mixture to manufacture an electrolyte membrane. The resulting electrolyte membrane includes the composite having an antioxidant in an ionic state and a first ionomer surrounding the antioxidant.

13 Claims, 3 Drawing Sheets

(51) Int. Cl.
  *H01M 8/1027* (2016.01)
  *H01M 8/1086* (2016.01)
  *H01M 8/10* (2016.01)
  *H01M 4/88* (2006.01)

(52) U.S. Cl.
  CPC .......... *H01M 8/1027* (2013.01); *H01M 4/881* (2013.01); *H01M 2008/1095* (2013.01); *H01M 2300/0088* (2013.01); *H01M 2300/0091* (2013.01)

(58) Field of Classification Search
  CPC ............. H01M 8/1039; H01M 8/1051; H01M 8/1048; H01M 8/1069; H01M 8/1081; H01M 2008/1095; H01M 2300/0088; H01M 2300/0091; H01M 4/881; H01M 4/8817
  See application file for complete search history.

(56) References Cited

U.S. PATENT DOCUMENTS

| | | | |
|---|---|---|---|
| 2007/0099053 A1* | 5/2007 | Frey | H01M 8/1081 429/495 |
| 2011/0070521 A1 | 3/2011 | Ishikawa | |
| 2016/0164114 A1 | 6/2016 | Kim | |
| 2018/0159149 A1 | 6/2018 | Kim | |
| 2019/0280307 A1* | 9/2019 | Ramaswamy | H01M 4/8605 |

* cited by examiner

ELECTROLYTE MEMBRANE OF A MEMBRANE-ELECTRODE ASSEMBLY HAVING IMPROVED CHEMICAL DURABILITY AND A MANUFACTURING METHOD THEREOF

CROSS-REFERENCE TO RELATED APPLICATIONS

This application is a divisional of U.S. application Ser. No. 16/385,985, which claims under 35 U.S.C. § 119(a) the benefit of priority to Korean Patent Application No. 10-2018-0166105 filed on Dec. 20, 2018, the entire contents of which are incorporated herein by reference.

BACKGROUND

(a) Technical Field

The present disclosure relates to an electrolyte membrane of a membrane-electrode assembly, the electrolyte membrane having improved chemical durability and a manufacturing method thereof.

(b) Background Art

Polymer electrolyte membrane fuel cells for vehicles are devices that generate electricity through an electrochemical reaction between hydrogen and oxygen in the air. Polymer electrolyte membrane fuel cells are well-known as next-generation, environmentally friendly, energy sources that have high electricity generation efficiency and almost no exhaust materials other than water.

The reaction for electricity production by fuel cells occurs in a membrane-electrode assembly (MEA). An MEA includes a perfluorinated sulfonic acid ionomer-based membrane and a pair of electrodes including an anode and a cathode.

Hydrogen supplied to an anode, which is an oxidation electrode for fuel cells, is split into a proton and an electron. The proton is moved through the membrane to a reduction electrode, i.e., a cathode, and the electron is moved via an exterior circuit to the cathode. At the cathode, an oxygen molecule, the proton, and the electron react together, thus producing electricity and heat and, at the same time, water ($H_2O$), as a byproduct.

In general, hydrogen and oxygen, which are reaction gases for fuel cells, crossover through the electrolyte membrane. At this time, hydrogen peroxide (HOOH) is produced. The hydrogen peroxide produces oxygen-containing radicals such as a hydroxyl radical (.OH) and a hydroperoxyl radical (.OOH). These radicals attack the perfluorinated sulfonic acid-based electrolyte membrane, inducing chemical is degradation of the membrane, which ultimately has the undesirable effect of reducing the durability of fuel cells.

As a conventional technology to mitigate such chemical degradation of the electrolyte membrane, the addition of various kinds of antioxidants to the electrolyte membrane has been suggested.

A representative example of the antioxidants is a cerium-based antioxidant. Cerium oxide or trivalent or tetravalent cerium ionsare added to the electrolyte membrane. Cerium ions have an excellent function as an antioxidant but have a shortcoming of being easily discharged outside the electrolyte membrane due to self-diffusion or an electro-osmosis phenomenon, which is caused by movement of moisture or hydrogen ions in the electrolyte membrane.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure is made in an effort to solve the above-described problems associated with the prior art.

It is an object of the present disclosure to provide an electrolyte membrane of a membrane-electrode assembly that has improved chemical durability by preventing an antioxidant in an ionic state from being discharged outside. It is also an object of the present disclosure to provide a manufacturing method for an electrolyte membrane of a membrane-electrode assembly.

However, the objects to be accomplished by the disclosure are not limited to the above-mentioned objects. The objects of the disclosure will be more apparent from the following description and will be realized by means of the elements and combinations thereof pointed out in the appended claims.

In one aspect, the present disclosure provides an electrolyte membrane of a membrane-electrode assembly. The electrolyte membrane includes a composite. The composite includes an antioxidant and a first ionomer surrounding the antioxidant, wherein the composite is dispersed in a second ionomer. The second ionomer is a polymer matrix.

In an embodiment, the antioxidant may be in an ionic state.

In another embodiment, the antioxidant may be a transition metal ion selected from the group consisting of $Ce^{3+}$, $Ce^{4+}$, $Mg^{2+}$, $Mg^{3+}$, and combinations thereof.

In still another embodiment, the first ionomer may be perfluorosulfonic acid (PFSA).

In yet another embodiment, a side chain of the first ionomer and the antioxidant may electrochemically attract each other.

In still yet another embodiment, the second ionomer may be perfluorosulfonic acid (PFSA).

In a further embodiment, the electrolyte membrane may include an ion channel. The ion channel may be a passage, through which a proton moves, and the composite may be located in the ion channel.

In another further embodiment, the weight ratio of the first ionomer to the second ionomer may range from 1:50 to 1:1000.

In another aspect, the present disclosure provides a method of manufacturing an electrolyte membrane of a membrane-electrode assembly. The method includes preparing an antioxidant solution containing a precursor of an antioxidant. The method also includes mixing the antioxidant solution and a first ionomer dispersion solution to prepare a mixture thereof. The method also includes drying the mixture of the antioxidant solution and the first ionomer dispersion solution to produce a composite including an antioxidant and a first ionomer surrounding the antioxidant. The method also includes introducing and mixing the composite with a second ionomer dispersion solution to prepare a mixture thereof. The method also includes applying the mixture of the composite and the second ionomer dispersion solution to a substrate and drying the mixture to manufacture an electrolyte membrane.

In an embodiment, the method may further include thermally treating the electrolyte membrane.

In another embodiment, the precursor of the antioxidant may be selected from the group consisting of cerium acetate, cerium chloride, cerium nitrate, cerium carbonate, cerium sulfate, ammonium cerium sulfate, manganese acetate, manganese chloride, manganese nitrate, manganese carbonate, manganese sulfate, and combinations thereof.

In still another embodiment, the mixture of the antioxidant solution and the first ionomer dispersion solution may be dried at a temperature of 25° C. to 280° C.

In yet another embodiment, the mixture of the composite and the second ionomer dispersion solution may be dried at a temperature of 25° C. to 100° C.

In still yet another embodiment, the electrolyte membrane may be thermally treated at a temperature of 160° C. to 200° C.

Other aspects and embodiments of the disclosure are discussed below.

BRIEF DESCRIPTION OF THE DRAWINGS

The above and other features of the present disclosure are described in detail with reference to certain embodiments thereof illustrated in the accompanying drawings, which are given herein below by way of illustration only, and thus are not limitative of the present disclosure, and wherein.

Figure 1:
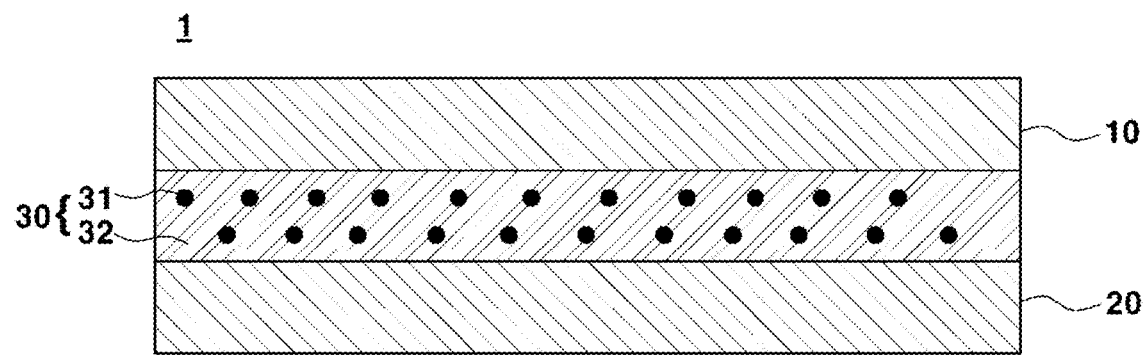
FIG. 1 is a cross-sectional view schematically showing a membrane-electrode assembly according to the present disclosure.

It should be understood that the appended drawings are not necessarily to scale, thus presenting a somewhat simplified representation of various features illustrative of the basic principles of the disclosure. The specific design features of the present disclosure as shown and described herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above objects, other objects, features, and advantages of the disclosure will be easily understood through embodiments with reference to the accompanying drawings. The disclosure may, however, be embodied in many different forms, and should not be construed as being limited to the embodiments set forth herein. Rather, these embodiments are provided so that this disclosure will be thorough and complete, and will fully convey the concept of the disclosure to those having ordinary skill in the art.

In the drawings, the same or similar elements are denoted by the same reference numerals even though they may be depicted in different drawings. In the drawings, the sizes of structures are exaggerated for clarity. It will be understood that, although the terms "first", "second", third, and the like may be used herein to describe various elements, these elements should not be limited by these terms. These terms are only used to distinguish one element from another. For example, a first element could be termed a second element, and, similarly, a second element could be termed a first element, without departing from the scope of the present disclosure. Singular forms are intended to include plural forms as well, unless the context clearly indicates otherwise.

It will be further understood that the terms "comprises", "includes", and/or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that when an element such as a layer, film, region, or plate is referred to as being "on" another element, it can be directly on the other element or intervening elements may also be present. It will also be understood that when an element such as a layer, film, region, or plate is referred to as being "under" another element, it can be directly under the other element or intervening elements may also be present.

Unless otherwise indicated, all numbers, values and/or expressions referring to quantities of ingredients, reaction conditions, polymer compositions, and formulations used herein are to be understood as modified in all instances by the term "about." Such numbers are inherently approximations that are reflective of, among other things, the various uncertainties of measurement encountered in obtaining such values. Further, where a numerical range is disclosed herein, such a range is continuous, and includes unless otherwise indicated, every value from the minimum value to and including the maximum value of such range. Still further, where such a range refers to integers, unless otherwise indicated, every integer from the minimum value to and including the maximum value is included.

FIG. 1 is a cross-sectional view schematically showing a membrane-electrode assembly 1 according to the present disclosure. The membrane-electrode assembly 1 includes a cathode 10, an anode 20, and an electrolyte membrane 30 provided between the cathode and the anode.

The electrolyte membrane 30 includes composites 31, each including an antioxidant and a first ionomer. The electrolyte membrane also includes a second ionomer 32, which is a polymer matrix in which the composites 31 are dispersed. Herein, the term "polymer matrix" is a membrane that is formed by entanglement of polymer resins constituting the second ionomer 32.

Figure 2:
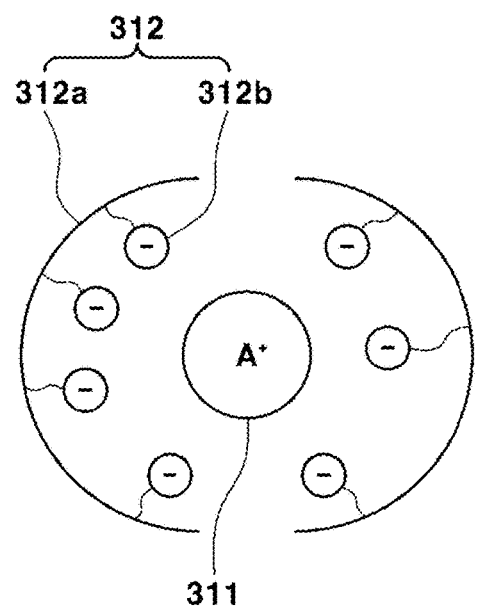
FIG. 2 is a view schematically showing a composite according to the present disclosure.

FIG. 2 is a view schematically showing the composite 31 according to the present disclosure. Referring to FIG. 2, the composite 31 includes an antioxidant 311 and a first ionomer 312 surrounding the antioxidant 311.

The antioxidant 311 is in an ionic state, which may be a transition metal ion selected from the group consisting of $Ce^{3+}$, $Ce^{4+}$, $Mg^{2+}$, $Mg^{3+}$, and combinations thereof.

The first ionomer 312 may be perfluorosulfonic acid (PFSA).

The first ionomer 312 includes a main chain 312a and a side chain 312b. The side chain 312b includes a sulfonic acid group ($-SO_3H$) as a functional group.

Specifically, the first ionomer 312 may be perfluorosulfonic acid (PFSA). The perfluorosulfonic acid (PFSA) includes polytetrafluoroethylene (PTFE) as the main chain and a sulfonic acid group as the side chain. The perfluorosulfonic acid (PFSA) has high hydrogen ion conductivity and has excellent chemical resistance and electrochemical stability due to dissociation of the sulfonic acid group(—$SO_3H$) in a hydrated state.

The side chain 312b of the first ionomer 312 and the antioxidant 311 electrochemically attract each other. Accordingly, the antioxidant 311 is prevented from being discharged outside the electrolyte membrane 30. Herein, the term "electrochemical attraction" means that electrostatic attraction is generated between a negative charge of the side chain 312b of the first ionomer 312 and a positive charge of the antioxidant 311.

The second ionomer 32 may be perfluorosulfonic acid (PFSA).

The second ionomer 32 includes a main chain and a side chain. The side chain includes a sulfonic acid group (—$SO_3H$).

The first ionomer 31 and the second ionomer 32 may be the same or different from each other in structure, equivalent weight (EW), and length or content of the side chain. However, it may be desirable that the first ionomer 31 and the second ionomer 32 be the same as each other.

Figure 3:
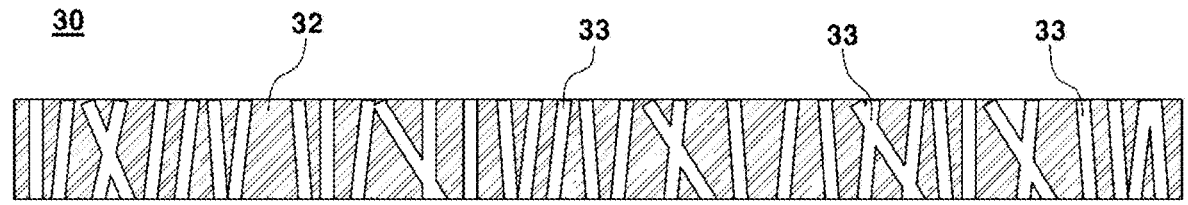
FIG. 3 is a reference view showing an ion channel formed in an electrolyte membrane according to the present disclosure.

FIG. 3 is a reference view showing ion channels 33 formed in the electrolyte membrane 30 according to the present disclosure. Referring to FIG. 3, the electrolyte membrane 30 includes ion channels 33, which are passages through which protons move.

The ion channels 33 are formed in the thickness direction of the electrolyte membrane 30 so that protons can move from the anode 20 to the cathode 10 therethrough.

Figure 4:
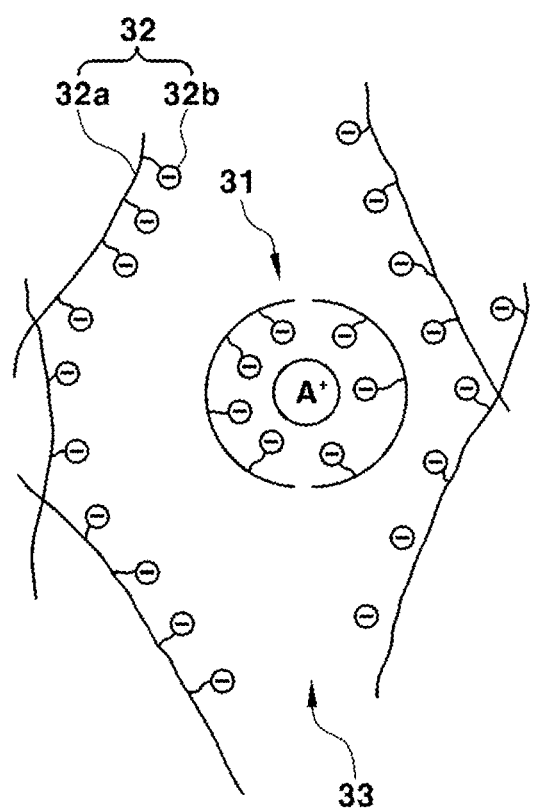
FIG. 4 is a reference view showing a composite and a second ionomer according to the present disclosure.

FIG. 4 is a reference view showing the composite 31 and the second ionomer 32 according to the present disclosure. Referring to FIG. 4, the ion channel 33 may be formed by continuous arrangement of a main chain 32a of the polymer constituting the second ionomer 32. Specifically, a side chain 32b is also continuously arranged in accordance with the arrangement of the main chain 32a. Moisture permeates into the electrolyte membrane 30 through a functional group of the side chain 32b, i.e. a sulfonic acid group (—$SO_3H$), and the ion channel 33 is formed.

The composite 31 is located in the ion channel 33. Thus, an interface is formed between the composite 31 and the second ionomer 32. Specifically, an interface is formed between the first ionomer 312 of the composite 31 and the second ionomer 32. Thus, the movement of the proton is not hindered, whereas the antioxidant 311, which has large particles and a high charge density, is caught in the interface. Accordingly, discharge of the antioxidant 311 is further suppressed.

The weight ratio of the first ionomer 312 to the antioxidant 311 may range from 1:1 to 1:50. The weight ratio of the first ionomer 312 to the second ionomer 32 may range from 1:50 to 1:1000. If the weight ratio is less than 1:50, the amount of the first ionomer 312 may be excessively large, and the size of the composite 31 may therefore become too large. Thus, the composites 31 may not be evenly dispersed in the second ionomer 32. Further, it may be impossible to suppress discharge of the antioxidant. On the other hand, if the weight ratio exceeds 1:1000, the amount of the first ionomer 312 may be excessively small, and the content of the antioxidant 311 may therefore become too small.

Figure 5:
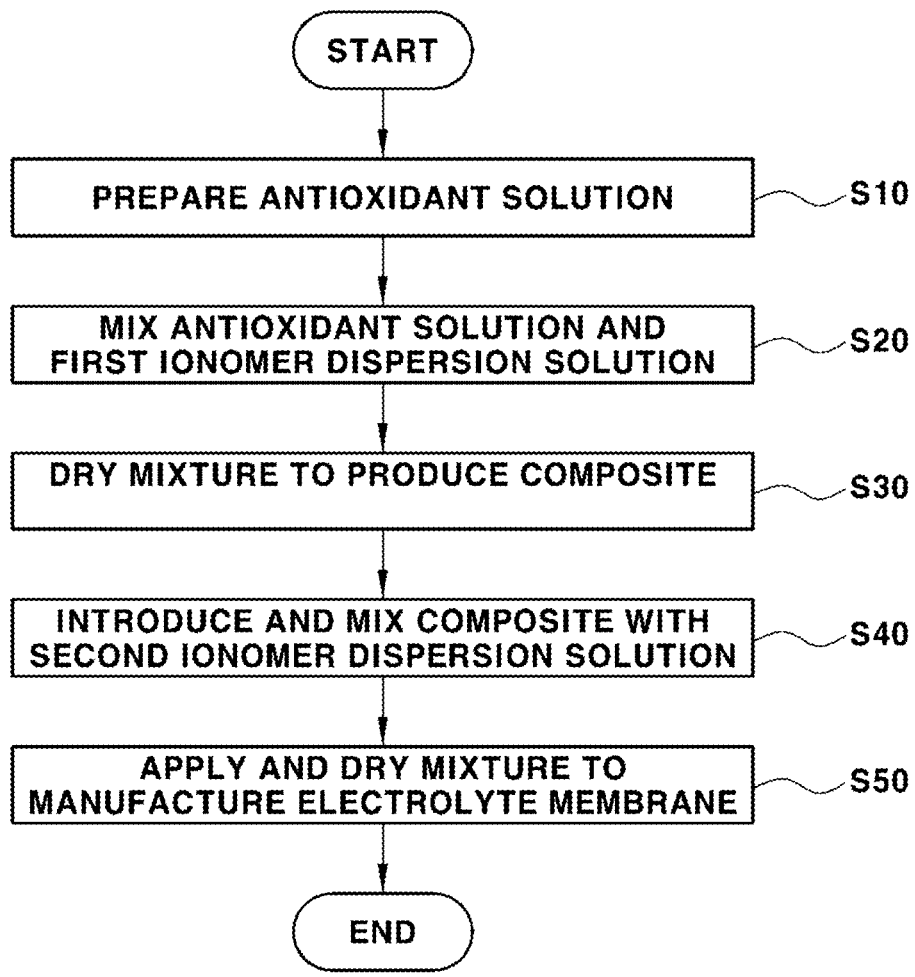
FIG. 5 is a flowchart showing a method of manufacturing an electrolyte membrane of a membrane-electrode assembly according to the present disclosure.

FIG. 5 is a flowchart showing a method of manufacturing the electrolyte membrane of a membrane-electrode assembly according to the present disclosure. Referring to FIG. 5, the electrolyte membrane manufacturing method includes a step of preparing an antioxidant solution containing a precursor of anantioxidant (S10). The manufacturing method also includes a step of mixing the antioxidant solution and a first ionomer dispersion solution (S20). The manufacturing method also includes a step of drying the mixture prepared in step S20 to produce a composite including an antioxidant and a first ionomer surrounding the antioxidant (S30). The manufacturing method also includes a step of introducing and mixing the composite with a second ionomer dispersion solution (S40). The manufacturing method also includes a step of applying the mixture prepared in the step S40 to a substrate and drying the mixture to manufacture an electrolyte membrane (S50).

The step S10 of preparing the antioxidant solution may be performed by dispersing the precursor of the antioxidant in a solvent such as water.

The precursor of the antioxidant may be selected from the group consisting of cerium acetate, cerium chloride, cerium nitrate, cerium carbonate, cerium sulfate, ammonium cerium sulfate, manganese acetate, manganese chloride, manganese nitrate, manganese carbonate, manganese sulfate, and combinations thereof.

Specifically, the step S10 of preparing the antioxidant solution may be performed by introducing and mixing powder-type cerium(III) nitrate hexahydrate with one or more solvents selected from the group consisting of water and alcohol.

The antioxidant solution and the first ionomer dispersion solution are mixed with each other (S20). The mixture is dried to produce the above-mentioned composite (S30).

Since the first ionomer was described above, a detailed description thereof will be omitted.

The first ionomer dispersion solution may be formed by dispersing the first ionomer in one or more solvents selected from the group consisting of water and alcohol.

The method of mixing the antioxidant solution and the first ionomer dispersion solution is not particularly limited. The mixing may be performed by appropriately setting an apparatus and conditions so that the antioxidant solution and the first ionomerare evenly mixed.

The mixture of the antioxidant solution and the first ionomer dispersion solution may be dried at a temperature ranging from 25° C. to a level at which the side chain of the first ionomer is lost. The temperature at which the side chain of the first ionomer is lost may be different depending on the type of the first ionomer. For example, in the case in which the first ionomer is perfluorosulfonic acid (PFSA), the mixture may be dried at a temperature of 25° C. to 280° C.

Since the composite was described above, a detailed description thereof will be omitted.

The composite is introduced into and mixed with the second ionomer dispersion solution (S40). The mixture is applied to a substrate and is dried to manufacture the electrolyte membrane (S50).

Since the second ionomer was described above, a detailed description thereof will be omitted.

The second ionomer dispersion solution may be formed by dispersing the second ionomer in one or more solvents selected from the group consisting of water and alcohol.

The method of mixing the composite and the second ionomer dispersion solution is not particularly limited. The mixing may be performed by appropriately setting an apparatus and conditions so that the composite and the second ionomer are evenly mixed.

The amount in which the mixture of the composite and the second ionomer dispersion solution is applied is not particularly limited but may be appropriately adjusted depending on the target thickness of the electrolyte membrane.

The mixture of the composite and the second ionomer dispersion solution may be dried at a temperature of 25° C. to 100° C.

The electrolyte membrane manufacturing method according to the present disclosure may further include a step of thermally treating the electrolyte membrane. Specifically, in the step of thermally treating, the electrolyte membrane may be thermally treated at a temperature of 160° C. to 200° C. The step of thermally treating the electrolyte membrane may be performed continuously or discontinuously with the step S50 of manufacturing the electrolyte membrane.

Hereinafter, the present disclosure is described in more detail with reference to examples set forth herein. These examples are provided only for illustration of the present disclosure and should not be construed as limiting the scope of the present disclosure.

EXAMPLE 1

(S10) 0.5 g of cerium(III) nitrate hexahydrate was dispersed in 1 g of water to prepare an antioxidant solution.

(S20) The antioxidant solution and 0.25 g of a first ionomer dispersion solution were mixed. Perfluorosulfonic acid (PFSA) was used as the first ionomer.

(S30) The mixture prepared in step S20 was dried in an oven at about 80° C. for about 1 hour to produce a composite.

(S40) The composite was introduced into and mixed with 4.75 g of a second ionomer dispersion solution. Perfluorosulfonic acid (PFSA) was used as the second ionomer.

(S50) 1 g of the mixture prepared in step S40 was applied to a glass substrate and was dried in an oven at about 80° C. for about 1 hour to manufacture an electrolyte membrane.

EXAMPLE 2

An electrolyte membrane was manufactured in the same method as in Example 1, except that the temperature of the oven in step S30 was changed to about 140° C.

COMPARATIVE EXAMPLE

An electrolyte membrane was manufactured in the following manner without using the first ionomer of the present disclosure.

0.5 g of cerium(III) nitrate hexahydrate was dispersed in 1 g of water to prepare an antioxidant solution.

The antioxidant solution and 5 g of a perfluorosulfonic acid (PFSA) dispersion solution were mixed.

1 g of the mixture was applied to a glass substrate and was dried in an oven at about 80° C. for about 1 hour to manufacture an electrolyte membrane.

TEST EXAMPLE

The amounts of the antioxidant discharged in the electrolyte membranes according to Example 1, Example 2, and the Comparative Example were measured using an X-ray fluorescence spectrometer.

Specifically, the initial content of cerium and the content of cerium after the electrolyte membrane was immersed in distilled water at about 25° C. for 2 minutes and was dried in an oven at about 80° C. for 10 minutes were measured. The measurement results are shown in Table 1 below.

TABLE 1

| Item | Example 1 | Example 2 | Comparative Example |
|---|---|---|---|
| Initial Cerium Content ($\mu g/cm^2$) | 490 | 511 | 516 |
| Cerium Content after Immersed in Distilled Water ($\mu g/cm^2$) | 270 | 331 | 261 |
| Cerium Loss Rate | 45% | 36% | 49% |

As can be seen from Table 1, the electrolyte membrane according to the present disclosure is capable of reducing the rate of loss of the antioxidant by about 4% to about 13% due to the complicated antioxidant discharge path thereof.

In addition, as can be seen from the results of Example 1 and Example 2, as the temperature at which the composite is produced is increased, the interface between the first ionomer and the second ionomer is more clearly formed, thereby greatly reducing the rate of loss of the antioxidant.

As is apparent from the above description, the electrolyte membrane of the membrane-electrode assembly according to the present disclosure is capable of greatly reducing the amount in which an antioxidant in an ionic state is discharged outside, compared to a conventional electrolyte membrane.

In addition, the membrane-electrode assembly according to the present disclosure has improved chemical durability, thereby extending the lifespan of a fuel cell including the same.

It will be appreciated by those having ordinary skill in the art that the effects achievable through the disclosure are not limited to those that have been particularly described herein above. Other effects of the disclosure will be more clearly understood from the above detailed description.

The disclosure has been described in detail with reference to embodiments thereof. However, it will be appreciated by those having ordinary skill in the art that changes may be made in these embodiments without departing from the principles and spirit of the disclosure, the scope of which is defined in the appended claims and their equivalents.

What is claimed is:

1. A method of manufacturing an electrolyte membrane of a membrane-electrode assembly, the method comprising:
   preparing an antioxidant solution containing a precursor of an antioxidant;
   mixing the antioxidant solution and a first ionomer dispersion solution to prepare a mixture thereof;
   drying the mixture of the antioxidant solution and the first ionomer dispersion solution to produce a composite comprising an antioxidant and a first ionomer surrounding the antioxidant;
   introducing and mixing the composite with a second ionomer dispersion solution including a second ionomer to prepare a mixture thereof; and
   applying the mixture of the composite and the second ionomer dispersion solution to a substrate and drying the mixture to manufacture an electrolyte membrane.

2. The method of claim 1, further comprising:
   thermally treating the electrolyte membrane.

3. The method of claim 2, wherein the electrolyte membrane is thermally treated at a temperature of 160° C. to 200° C.

4. The method of claim 1, wherein the precursor of the antioxidant is selected from the group consisting of cerium acetate, cerium chloride, cerium nitrate, cerium carbonate, cerium sulfate, ammonium cerium sulfate, manganese acetate, manganese chloride, manganese nitrate, manganese carbonate, manganese sulfate, and combinations thereof.

5. The method of claim 1, wherein the first ionomer is perfluorosulfonic acid (PFSA).

6. The method of claim 1, wherein the mixture of the antioxidant solution and the first ionomer dispersion solution is dried at a temperature of 25° C. to 280° C.

7. The method of claim 1, wherein the second ionomer is PFSA.

8. The method of claim 1, wherein the mixture of the composite and the second ionomer dispersion solution is dried at a temperature of 25° C. to 100° C.

9. The method of claim 1, wherein the second ionomer is a polymer matrix.

10. The method of claim 1, wherein the antioxidant is in an ionic state.

11. The method of claim 1, wherein the antioxidant is a transition metal ion selected from the group consisting of $Ce^{3+}$, $Ce^{4+}$, $Mg^{2+}$, $Mg^{3+}$, and combinations thereof.

12. The method of claim 1, wherein a side chain of the first ionomer and the antioxidant electrochemically attract each other.

13. The method of claim 1, wherein a weight ratio of the first ionomer to the second ionomer is 1:50 to 1:1000.

\* \* \* \* \*